United States Patent [19]

Ogawa et al.

[11] Patent Number: 5,757,583
[45] Date of Patent: May 26, 1998

[54] DISC DRIVE HAVING AUTOMATIC CLAMP AND DISC EJECTION ARRANGEMENTS

[75] Inventors: Tetsu Ogawa, Hanazono-machi; Masaru Koyahara, Chichibu; Minoru Tsuruta, Ogano-machi, all of Japan

[73] Assignee: Canon Denshi Kabushiki Kaisha, Chichibu, Japan

[21] Appl. No.: 267,313

[22] Filed: Jun. 29, 1994

Related U.S. Application Data

[63] Continuation of Ser. No. 641,937, Jan. 16, 1991, abandoned.

[30] Foreign Application Priority Data

Jan. 20, 1990 [JP] Japan ................ 2-11031

[51] Int. Cl.$^6$ .................... G11B 33/12; G11B 17/04; G11B 17/022
[52] U.S. Cl. .................... 360/99.07; 360/99.06; 360/99.12; 369/75.2; 369/77.2; 369/270
[58] Field of Search .................... 360/99.03, 97.01, 360/99.02, 99.05, 137, 99.12, 99.06, 99.07, 96.5, 96.6; 369/75.1, 75.2, 77.1, 77.2, 270, 271

[56] References Cited

U.S. PATENT DOCUMENTS

| 4,193,102 | 3/1980 | Beuch et al. | 360/99.05 |
|---|---|---|---|
| 4,396,963 | 8/1983 | Wright | 360/99.06 |
| 4,413,294 | 11/1983 | Beijer | 360/99.05 |
| 4,523,240 | 6/1985 | Dunstan et al. | 360/99.05 |
| 4,541,025 | 9/1985 | Sidhu et al. | 360/99.05 |
| 4,628,376 | 12/1986 | Kato et al. | 360/71 |
| 4,651,246 | 3/1987 | Becker | 360/99.02 |
| 4,656,544 | 4/1987 | Yamanouchi | 360/99.03 |
| 4,670,802 | 6/1987 | Ogawa et al. | 360/99.03 |
| 4,766,510 | 8/1988 | Okita et al. | 360/106 |
| 4,786,998 | 11/1988 | Sugawara et al. | 360/99.07 |
| 4,965,685 | 10/1990 | Thompson et al. | 360/97.01 |
| 5,001,592 | 3/1991 | Koyahara | 360/137 |
| 5,126,899 | 6/1992 | Kanazawa | 360/99.06 |

FOREIGN PATENT DOCUMENTS

| 58-211378 | 12/1983 | Japan | 360/97.01 |
|---|---|---|---|
| 59-96559 | 6/1984 | Japan . | |
| 60-63761 | 4/1985 | Japan | 360/99.07 |
| 61-276193 | 12/1986 | Japan | 360/99.02 |

*Primary Examiner*—Craig A. Renner
*Attorney, Agent, or Firm*—Spencer & Frank

[57] ABSTRACT

A disc drive for use with a disc-shaped recording medium, includes a disc driving mechanism for driving the recording medium mounted on a disc mounting surface thereof and a clamping mechanism for clamping the recording medium on the disc mounting surface of the disc drive mechanism. A further driving mechanism is provided for moving the clamping mechanism into a clamping position in which it clamps the recording medium on the disc mounting surface and maintains the clamping mechanism in the clamping position. A motor drives the further driving mechanism. A manually operated mechanism releases transmission between the further driving mechanism and the motor, and manually operates the further driving mechanism to eject the recording medium out of the disc drive.

26 Claims, 6 Drawing Sheets

5,757,583

1

DISC DRIVE HAVING AUTOMATIC CLAMP AND DISC EJECTION ARRANGEMENTS

This application is a Continuation of application Ser. No. 07/641,937, filed Jan. 16, 1991 (now abandoned).

BACKGROUND OF THE INVENTION

1. Field of the Invention

The present invention relates generally to disc drive mechanisms and more specifically to a disc drive which includes automatic disc clamp and disc ejection arrangements.

2. Description of the Prior Art

Automatic disc clamp and eject mechanisms are widely used in current disc drives for automatically clamping a rotatable disc shaped recording media on which data is recorded in a position wherein it can be rotatably driven, and for automatically ejecting the same from the position.

However, these arrangements have suffered from drawbacks in that when a power failure occurs or the clamp motor control circuit malfunctions, the automatic clamp release function is lost, and there is a problem as to how to achieve disc ejection.

A solution to the above problem has been proposed in Japanese Patent Application Laying-open No. 59-96559. This arrangement includes a manually operable disc ejection mechanism wherein a motor driven arrangement which clamps a disc in place, includes a rotatable worm gear on which a grooved cap is secured. In the event the power supply is cut-off or the motor control circuit fails and the clamp means is rendered inoperative, it is possible to insert a screw driver into the grooves of the cap in a manner which enables the manual rotation of the worm gear.

However, with this type of arrangement the amount of movement induced in the release direction of a cam associated with the worm gear, per rotation of the worm gear is extremely small and it is accordingly necessary to do a lot of tiresome work before the necessary number of worm gear rotations needed to move the cam, which is operatively connected to the worm gear and which forms a part of the disc clamp device, is moved to a release position.

SUMMARY OF THE INVENTION

It is an object of the present invention to provide a disc drive mechanism which includes a simple arrangement via which a disc clamp can be readily released manually.

It is a further object of the present invention to provide a disc drive arrangement which enables the disc clamping to be released in a short period of time.

A yet further object of the present invention is to provide a disc drive arrangement which will eject a disc upon manual dissolution of the clamping which holds the disc in place in the drive.

A first aspect of the present invention comes in a disc drive which comprises:

drive means for driving a disc type body on which data can be recorded;

clamp means for clamping the disc in a predetermined relationship with the disc drive means;

a cam device for moving the clamp means into a clamping position and maintaining it in the clamping position;

cam drive means for selectively driving the cam; and manually operable means for releasing the connection between the cam device and the drive means.

2

Here, a disc drive may further comprise biasing means for biasing the disc type body in the clamping position in an eject direction.

The clamp means may comprise:

a clamp lever which is movably mounted on a base;

a support member which is operatively connected with the clamp lever in a manner wherein it can be moved vertically with respect to the base; and a center cone which is rotatably supported on said support member.

The cam device may comprise:

a cam member which is rotatably supported on the base;

a cam surface formed on the cam, the cam surface being engaged a cam follower formed on the clamp lever; and a first gear formed on the cam member.

The cam drive means may comprise:

a motor supported on the base;

a second gear which is rotatably supported on the base via which the motor is placed in drive connection with the cam member.

The manually operable connection releasing means may include a release lever which is movable with respect to the base, the release lever including a slanted surface which is engageable with the second gear for displacing the second gear with respect to the base.

The manually operable connection releasing means may comprise:

a projection formed on the base;

a release lever which is axially movable over the surface of the base, the release lever being guided by the projection in a manner which induces the second gear for displacing the second gear with respect to said base.

The biasing means may comprise:

a third lever which is pivotally mounted on the base;

a spring which is operatively connected with the third lever for biasing the third lever to rotate in a first rotational direction, the third lever being arranged to trigger a switch which energizes the cam drive means when rotated against the bias of the spring by a predetermined amount.

The release lever may have an end portion which is engageable with the first gear formed on the cam member for inducing the cam member to rotate.

The cam drive means may comprise:

a motor which is supported on the base;

a worm gear rotatably driven by the motor;

a second gear which is rotatably supported on a shaft on the base and is axially movable along the shaft, the second gear having first and second sets of gear teeth, the worm gear being arranged to mesh with the first set of gear teeth;

an idler gear being arranged to mesh with the second set of gear teeth and the first gear formed on the cam member; and a spring which biases the second gear toward a position wherein the first and second sets of gear teeth are maintained in meshing engagement with the worm gear and the idler gear respectively.

The manually operable connection releasing means may comprise:

a release lever which is movable with respect to the base;

a slanted surface formed on the release lever which is engageable with the second gear for displacing the second gear against the bias of the spring to a position wherein the drive connection between the first and second sets of gear teeth and the worm gear and the idler gear, is disengaged.

The present invention is further deemed to be embodied by a disc drive in which a floppy disc can be inserted, which is responsive to the insertion of the disc in a manner to automatically clamp the disc in a predetermined condition, and which features: a case on which a manually operably button is provided, the button forming part of a disc ejection means; a manually operable disc clamp release mechanism; and an eject mechanism for ejecting an inserted disc following the release of the automatic clamping.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
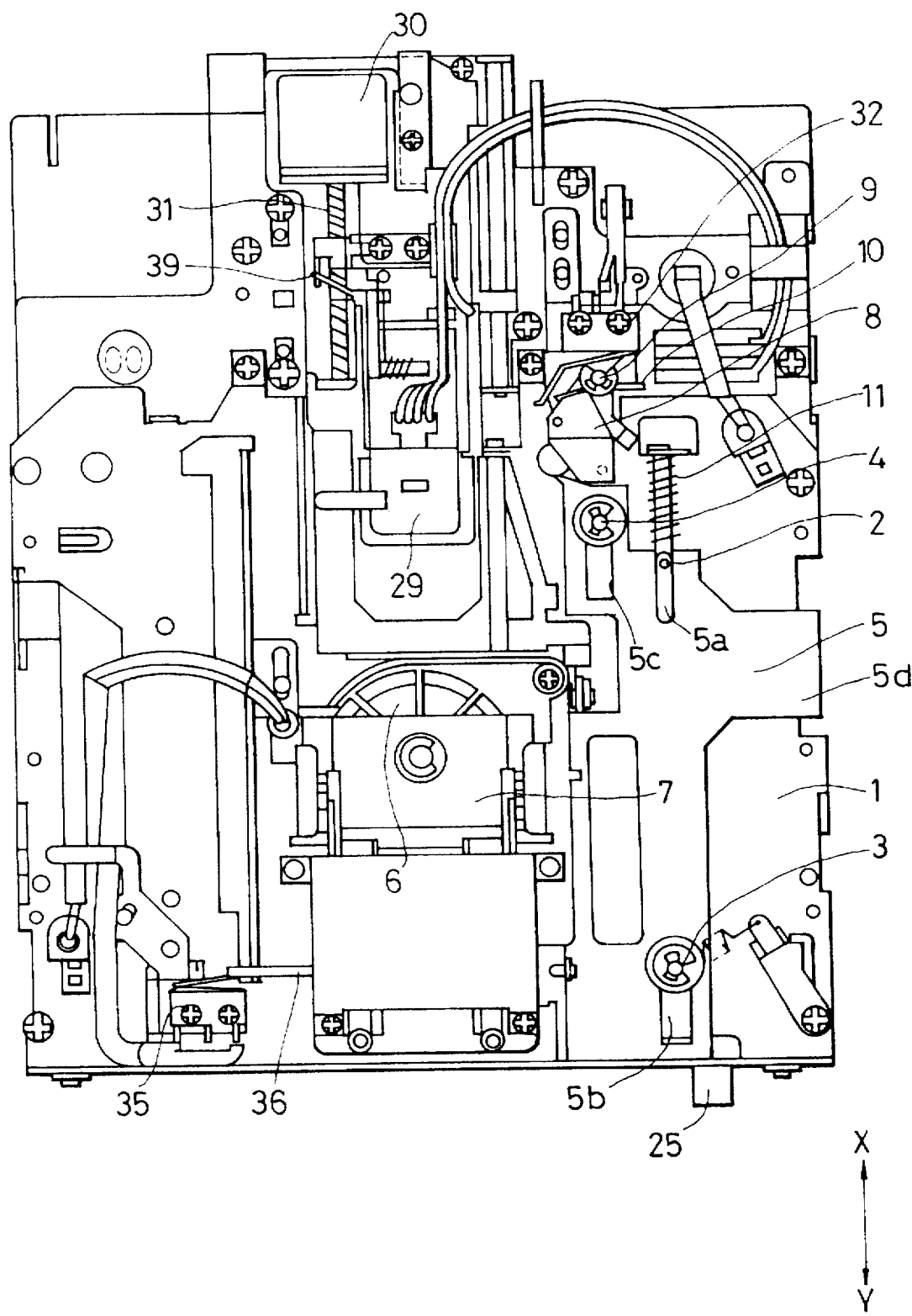
FIG. 1 is a plan view showing the upper side of a disc drive according to an embodiment of the present invention.

A base member or plate, having first and second opposite sides, 1 is formed with a number of vertically upward extending pins 2, 3 and 4. A clamp lever 5 is formed with elongate openings 5a, 5b and 5c in which the pins 2, 3 and 4 are respectively received. With this arrangement, the clamp lever 5 is axially movable back and forth with respect to the base 1 in the X-Y direction. The clamp lever 5 is connected with a support member 7 rotatably supporting a frusto-conical shaped center cone 6 which centers a disc and cramps it on a non-illustrated spindle. The support member 7 is connected with the clamp lever 5 so that the center cone is moved up and down with respect to the spindle in response to the movement of the clamp lever 5 back and forth in the X-Y direction.

When the clamp lever 5 is moved forward (viz., in the X direction) in order to eject a disc, an eject lever 8 is induced to pivot about pin 9 on which it is supported, against the resistance of a torsion spring 10 which biases the eject lever 8 to rotate in the counter clockwise direction (as seen in FIG. 1).

When a disc is inserted into the drive, the above mentioned eject lever 8 is induced to rotate via engagement with the leading edge of the disc housing or jacket, against the bias of the spring 10 until it is latched in a predetermined position after undergoing a given amount of rotation. When the disc is ejected the latching is released and the disc is pushed in an ejection direction.

A spring 11 is disposed between the leading edge of the clamp lever 5 and the base 1 and arranged to normally bias the clamp lever 5 in the Y direction.

The clamp lever 5 is formed with a support 5d which is bent into a channel-like configuration which extends down and around one side of a side edge of the base 1. A cam follower 12 is supported on the inboard surface of the inwardly extending end portion of the support 5d.

A sub-chassis 13 is fixed to the base 1 with a predetermined gap therebetween by way of screws. A crank lever driving DC motor 14 is fixed to the sub-chassis 13. The output shaft of the motor 14 is provided with a worm gear 15. This worm gear 15 is arranged to mesh with a clutch gear 16 which is rotatably supported on a shaft 17. A gear 18, which is formed integrally on the lower side of the clutch gear 16, is arranged to mesh with an idler gear 20 which is rotatably supported on the sub-chassis 13 by way of a shaft 19.

The idler gear 20 meshes with a gear portion 22a of a clamp cam 22 and thus establishes a drive connection between the motor 14 and the clamp cam 22. The clamp cam 22 is rotatably supported on a shaft 21 formed on the sub-chassis 13.

The upper side of the clamp cam 22 is formed with a cam surface 22b (see FIG. 2) which is arranged to engage the above mentioned cam follower 12. The cam follower 12 is rotatably supported on a shaft 23 formed on the support 5d of the clamp lever 5.

Figure 4:
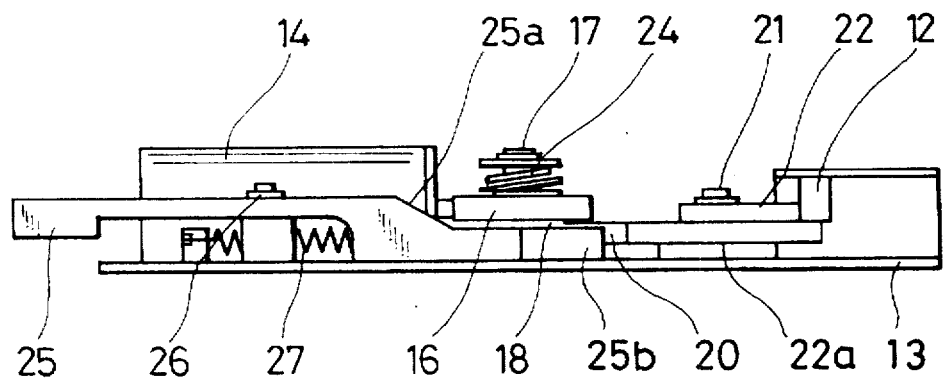
FIG. 4 is a side elevational view showing the disc clamp mechanism shown in FIG. 3.

The clutch gear 16 is arranged to be movable along the shaft 17 on which it is rotatably supported and normally biased downward by a gear return spring 24 which is mounted on the upper end of the shaft 17 in the manner illustrated in FIG. 4.

Figure 2:
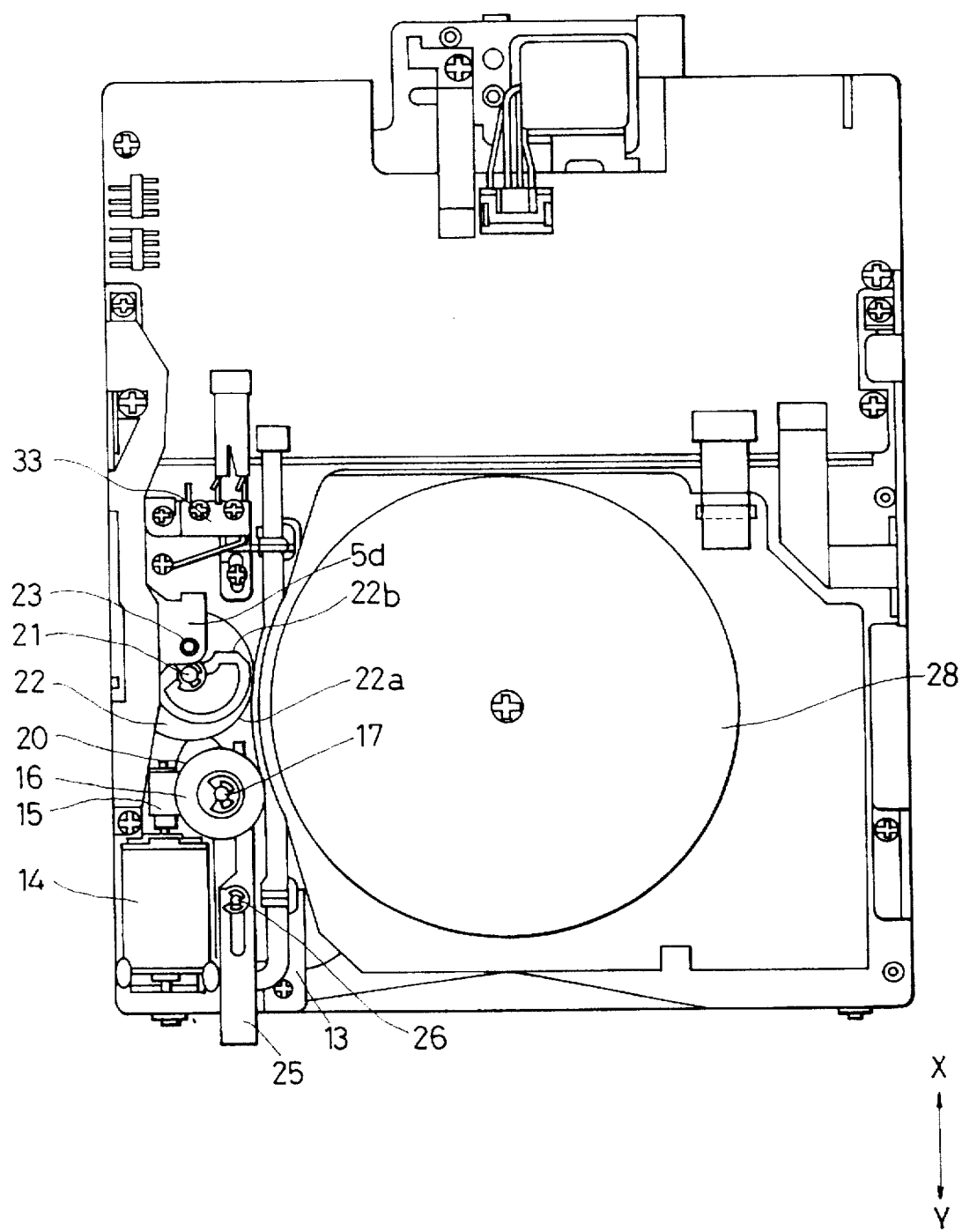
FIG. 2 is a bottom view as seen from the lower side of the disc drive of the present invention.
Figure 3:
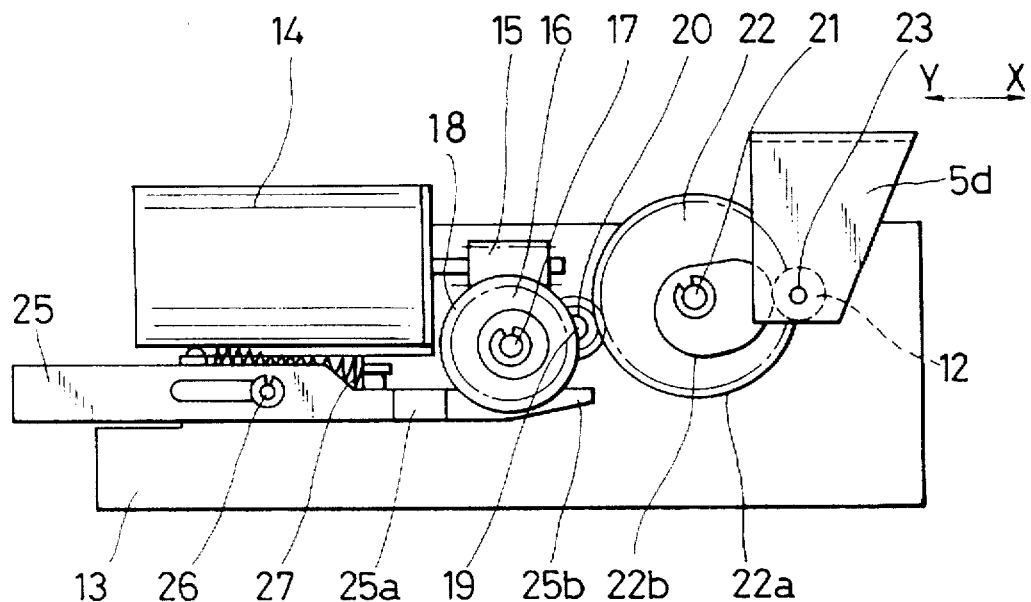
FIG. 3 is a plan view showing a disc clamp mechanism used in the arrangement shown in FIGS. 1 and 2.

As shown in FIGS. 2 and 3, a lever 25 is slidably supported on the sub-chassis 13 by way of a shaft 26 at a location proximate the motor 14 and guided so as to be axially movable in the X-Y direction. The lever 25 forms part of a manually operable arrangement and is biased in the Y direction by a return spring 27.

The lever 25 is formed with a slanted surface portion 25a which is movable between the clutch gear 16 and the sub-chassis 13, and an end portion 25b which is movable below the clutch gear 16 and engageable with the gear teeth 22a formed about the periphery of the clamp cam 22.

It should be noted that a direct drive motor 28 is in drive connection with the above mentioned spindle; and that a magnetic read/write head unit 29 is moved by a lead screw 31 connected with an output shaft of a pulse motor 30 and a pin 39 connected therewith in the X-Y direction.

A disc set switch 32 is arranged to be switched ON-OFF in response to the movement of the eject lever 8 which accompanies disc insertion. When the disc set switch 32 detects that a disc has assumed a predetermined position, it assumes an ON state and induces the energization of motor 14.

A clamp end switch 33 is arranged to be switched ON-OFF in response to the clamp lever 5 being moved in the X direction in order to clamp a disc, and detects the end of the disc clamping. The motor 14 is stopped in response to this latter mentioned detection.

Figure 7:
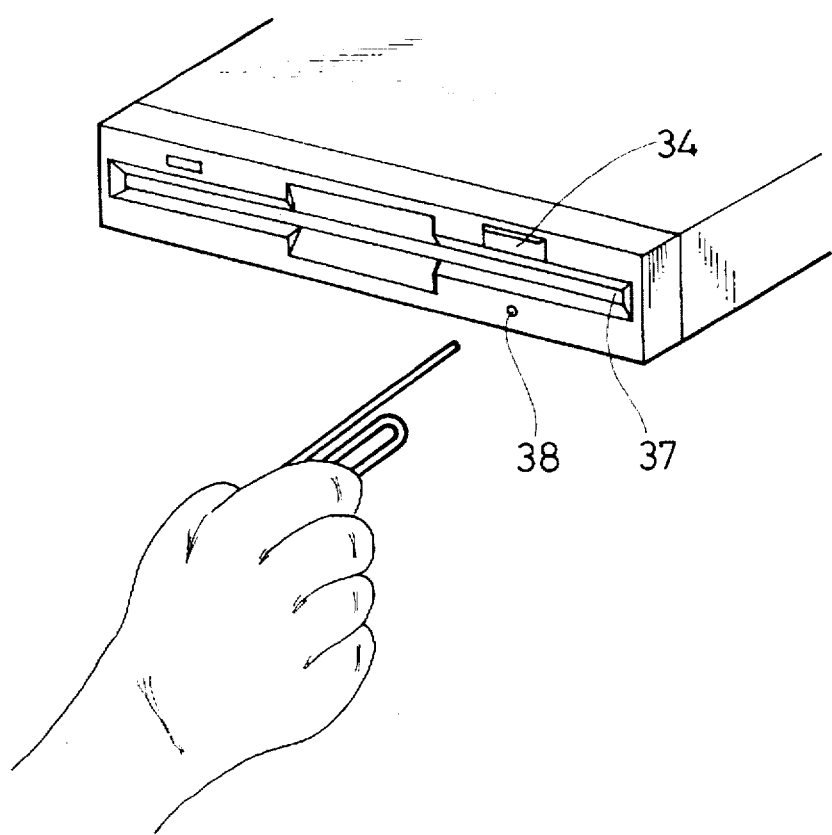
FIG. 7 is a perspective view of a disc drive according to the present invention.

As shown in FIG. 7, the front face of the disc drive has a front panel which includes an eject switch 34 via which a disc eject command can be issued.

An ON-OFF switch 35 is operated by a lever 36 which is fixed to the clamp lever 5. When the disc clamp is released, the switch 35 is arranged to detect the clamp lever 5 returning to its initial position and to stop the rotation of the motor 14.

OPERATION

A disc is inserted into the disc insertion opening 37 until it abuts the disc eject lever 8. Following this, it is pushed against the resistance of the spring 10 until the eject lever 8 rotates about the pin 9 and assumes the previously described predetermined position wherein the disc set switch 32 is triggered. In response to this the motor 14 is energized in a manner whereby rotation is transmitted via the worm gear 15, clutch gear 16, gear 18, idler gear 20 to the clamp cam 22 which begins rotating in a predetermined rotational direction. In accordance with this operation, the engagement between the cam follower 12 and the clamp cam 22 induces the clamp lever 5 to be displaced in the X direction. This induces the center cone 6 which is operatively connected with the clamp lever 5 by way of the support member 7 to be lowered to the spindle and clamps the disc which has been inserted.

Figure 5:
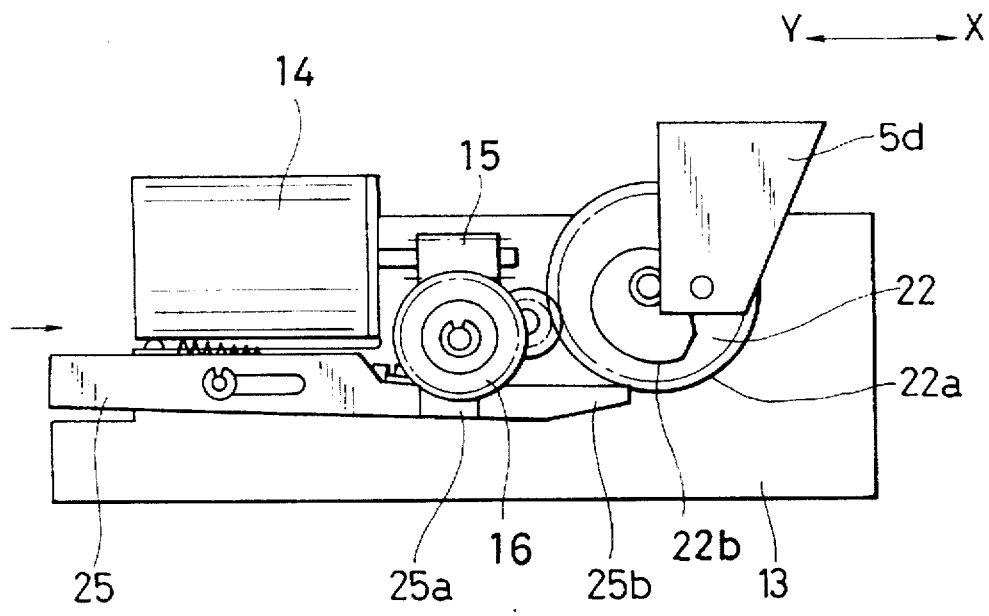
FIG. 5 is a side elevation of the disc clamp mechanism shown in FIG. 3 showing the device undergoing a manual release operation.
Figure 6:
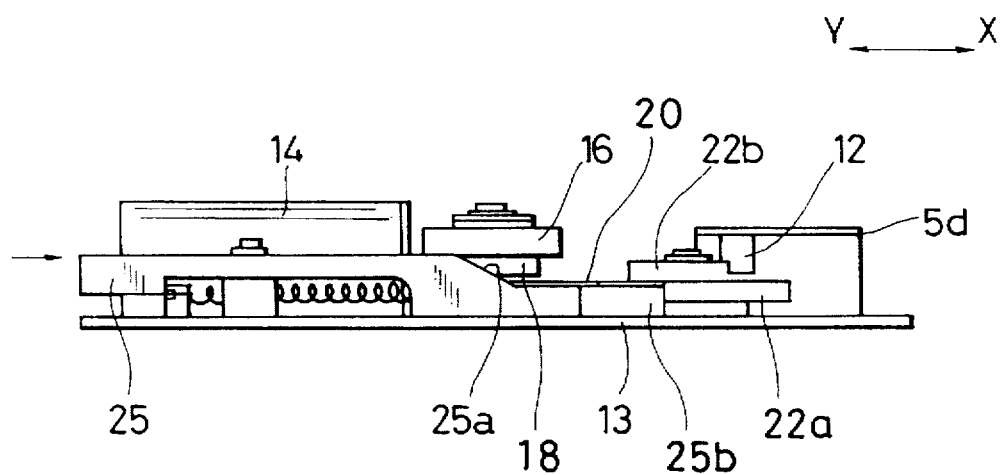
FIG. 6 is a side elevational view of the disc clamp mechanism shown in FIG. 4 showing the device undergoing the manual release operation depicted in FIG. 5.

Under these clamped conditions, in the event that power is lost or, the motor or the motor control circuit should malfunction, it is possible for a pin or a like type probe to be manually inserted through a small diameter opening 38 formed in the front panel of the disc drive, in a manner which engages the front end of the lever 25 (FIG. 7). By manually pushing the lever 25 in the X direction against the resistance of the return spring 27, the slanted surface portion 25a engages the lower surface of the clutch gear 16 and urges the same upward against the bias of the gear return spring 24 as shown in FIGS. 5 and 6. This upward movement of the clutch gear 16 disengages the connection between the integrally formed gear 18 and the idler gear 20 in a manner which removes the force which has moved the clamp lever 5 into its clamping position. As a result, the clamp lever spring 11 biases the clamp lever 5 in the Y direction and induces the clamp cam 22 to rotate in a manner which unlocks the clamp and causes the disc to be ejected.

It will be noted that in connection with the above mentioned rotation of the clamp cam 22, even though the connection between the worm gear 15 and the clamp cam 22 is broken by the above described movement of the lever 25, the force of the clamp lever return spring 11 alone cannot induce the rotation of the clamp cam 22 as the cam follower 12 is in engagement with the dead point of the cam surface 22b. To overcome this, as the lever 25 is axially displaced in the X direction, the end 25b of the lever 25 engages the gear teeth 22a formed on the clamp cam 22 as shown in FIGS. 5 and 6, and rotates the clamp cam 22 in the counter clockwise direction. This rotates the clamp cam 22 to a position wherein the cam follower 12 is released and enables the clamp lever 5 to be moved in the Y direction under the influence of the clamp lever spring 11.

SECOND EMBODIMENT

Figure 8:
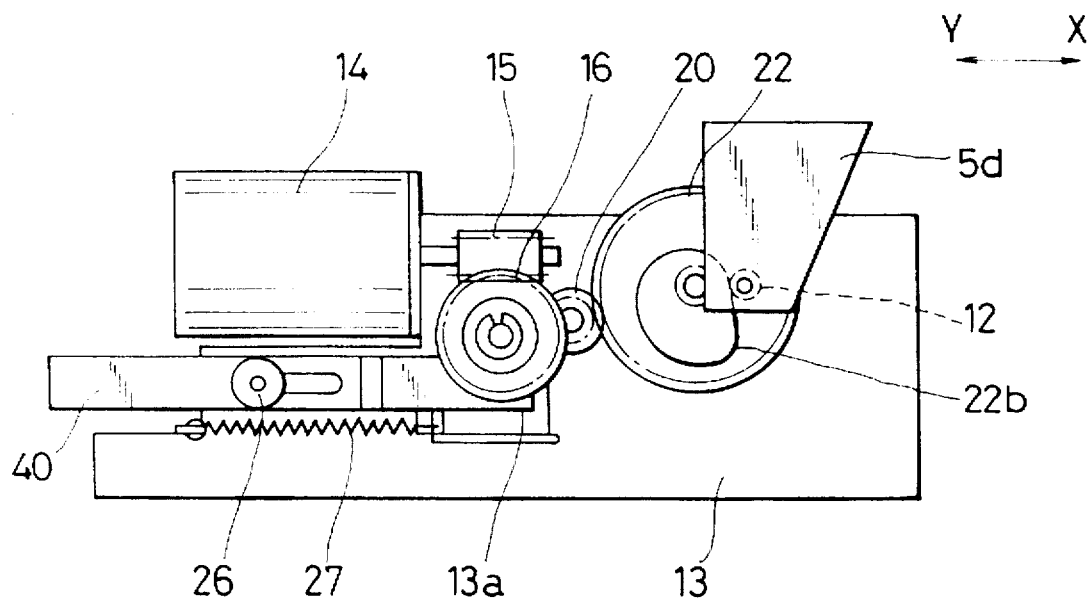
FIG. 8 is a plan view showing a second embodiment of a disc clamp mechanism according to the present invention.
Figure 9:
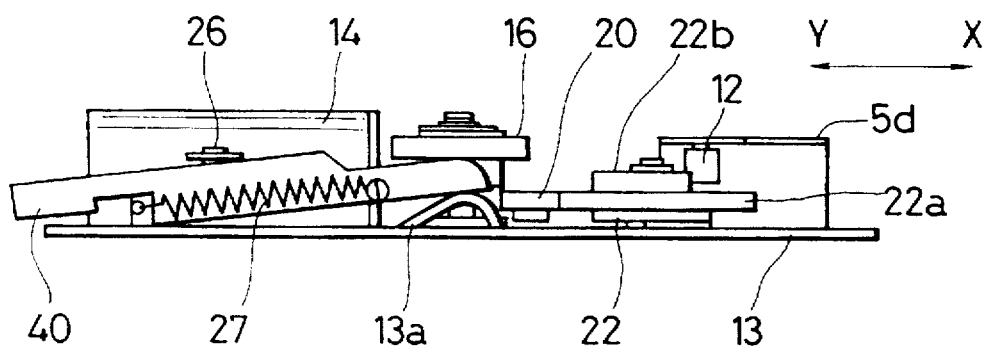
FIG. 9 is an side elevational view of the embodiment shown in FIG. 8.

FIGS. 8 and 9 show a second embodiment of the present invention. In this embodiments parts which correspond to those described in connection with the first embodiment are identified by corresponding reference numerals. The construction of the second embodiment is very similar to the first one, and differs in that a manual disc ejection lever 40 is mounted so as to be selectively movable in the X-Y direction while the sub-chassis 13 is formed with an upwardly bent portion which defines a projection 13a proximate the clutch gear 16.

The above mentioned projection 13a is arranged to cooperate with the lever 40 in a manner which provides the same effect as the slanted surface portion 25a formed on the lever 25. That is to say, the provision of the projection 13a is such as to induce the disconnection between the worm gear 15 and the clutch gear 16. More specifically, when the lever 40 is displaced in the X direction, it rides up on the projection 13a and becomes inclined in a manner shown in FIG. 9. As a result, the clutch gear 16 is moved upwardly against the bias of the gear return spring 24. This moves the integral gear 18 up and out of mesh with the idler gear 20, thus braking the drive connection between the worm gear 15 and the clutch gear 16.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disc drive apparatus including a base plate having first and second opposite sides, and using a disc-shaped recording medium, said apparatus comprising:

disc mounting means, provided on the first side of said base plate and having a disc mounting surface for mounting said recording medium thereon;

disc driving means, provided on the second side of said base plate for driving the recording medium mounted on said disc mounting surface;

disc loading means, mounted on the first side of said base plate, for loading the recording medium on said disc mounting surface of said disc mounting means and ejecting the recording medium mounted on said disc mounting surface;

urging means for urging said disc loading means to eject the recording medium from said disc mounting means;

a driving mechanism, mounted on the second side of said base plate for driving said disc loading means into a loaded position in which said recording medium is mounted on said disc mounting surface, maintaining said loading means in said loaded position, and driving said loading means to eject said recording medium, said driving mechanism including a cam member and a gear train which drive said disc loading means, said cam member and said gear train being adjacently and rotatably mounted and supported on the second side of said base plate in such a manner that rotating planes of said cam member and said gear train are parallel to the second side of said base plate;

a loading motor for driving said cam member and said gear train; and manually operating means provided on the second side of said base plate for releasing a transmission between said driving mechanism and said loading motor and for manually triggering said driving mechanism to eject said recording medium from said disc drive apparatus by an urging force of said urging means, whereby said disc driving means shares vertical space with said driving mechanism thereby minimizing a thickness of said disc drive apparatus.

2. A disc drive apparatus as claimed in claim 1, further comprising urging means for biasing said recording medium in the loaded position in an eject direction.

3. A disc drive apparatus as claimed in claim 2, wherein said loading means comprises:

a clamp lever which is movably mounted on said base plate;

a support member which is operatively connected with said clamp lever in a manner wherein it is movable in a direction perpendicular to a side of said base plate; and a center cone which is rotatably supported on said support member.

4. A disc drive apparatus as claimed in claim 3, wherein:

said cam member is rotatably mounted and supported on said base plate;

a cam surface is formed on said cam member;

said cam surface is engaged with a cam follower formed on said clamp lever; and a first gear is formed on said cam member.

5. A disc drive apparatus as claimed in claim 4, wherein said gear train has a second gear which is rotatably mounted and supported on said base plate via which said motor is placed in drive connection with said cam member.

6. A disc drive apparatus as claimed in claim 5, wherein said manually operating means includes a release lever which is movable with respect to said base plate; and wherein said release lever includes a slanted surface which is engageable with said second gear for displacing said second gear with respect to said base plate.

7. A disc drive apparatus as claimed in claim 5, wherein said manually operating means comprises:

a projection formed on said base plate; and a release lever which is axially movable over said second surface of said base plate, said release lever being guided by said projection in a manner which displaces said second gear with respect to said base plate.

8. A disc drive apparatus as claimed in claim 2, wherein said biasing means comprises:

a lever which is pivotally mounted on said base plate; and a spring which is operatively connected with said lever for biasing the lever to rotate in a first rotational direction, said lever being arranged to trigger a switch which energizes said loading motor when rotated against the bias of said spring by a predetermined amount.

9. A disc drive apparatus as claimed in claim 6, wherein said release lever has an end portion which is engageable with the first gear formed on said cam members for inducing the cam member to rotate.

10. A disc drive apparatus as claimed in claim 4, wherein said gear train comprises:

a worm gear rotatably driven by said motor;

a second gear rotatably supported on a shaft on said base plate and axially movable along said shaft, said second gear having first and second sets of gear teeth, said worm gear being arranged to mesh with said first set of gear teeth; and an idler gear arranged to mesh with said second set of gear teeth and the first gear formed on said cam member; and wherein said disc drive apparatus further comprises:

a spring biasing said second gear toward a position wherein said first and second sets of gear teeth are maintained in meshing engagement with said worm gear and said idler gear respectively.

11. A disc drive apparatus having a base, and using a disc-shaped recording medium, said apparatus comprising:

disc drive means mounted on a first surface of said base for driving said recording medium mounted on a disc mounting surface thereof;

loading means for loading the recording medium on said disc mounting surface of said disc drive means, said loading means including a clamp lever which is movably mounted on said base;

a support member which is operatively connected with said clamp lever in a manner wherein it is movable vertically with respect to said base; and a center cone which is rotatably supported on said support member;

a drive mechanism, mounted on the same surface of said base as said disc drive means for driving said loading means into a loaded position in which said recording medium is mounted on said disc mounting surface, maintaining said loading means in said loaded position, and driving said loading means to eject said recording medium;

biasing means for biasing said recording medium in the loaded position in an eject direction;

a motor for driving a cam member and a gear train which drive said drive mechanism, wherein said motor, said cam member and said gear train are mounted on a second surface of said base which is the reverse side of said first surface, said cam member and said gear train being adjacently provided horizontal and parallel to said second surface, wherein:

said cam member is rotatably mounted and supported on said base;

a cam surface, formed on said cam member, is engaged with a cam follower formed on said clamp lever; and a first gear is formed on said cam member; and wherein, said gear train comprises a worm gear rotatably driven by said motor;

a second gear rotatably supported on a shaft on said base and axially movable along said shaft, said second gear having first and second sets of gear teeth, said worm gear being arranged to mesh with said first set of gear teeth; and an idler gear arranged to mesh with said second set of gear teeth and the first gear formed on said cam member;

a spring biasing said second gear toward a position wherein said first and second sets of gear teeth are maintained in meshing engagement with said worm gear and said idler gear respectively; and manually operating means provided on said second surface of said base and parallel to said second surface, for releasing a transmission between said drive mechanism and said motor and manually triggering to operate said drive mechanism to eject said recording medium out of said disc drive apparatus, said manually operating means comprising a release lever which is movable with respect to said base; and a slanted surface formed on said release lever which is engageable with said second gear for displacing said second gear against the bias of said spring to a position wherein the drive connection between said first and second sets of gear teeth and said worm gear and said idler gear, is disengaged.

12. A disc drive apparatus as claimed in claim 11 wherein said release lever has an end portion which is engageable with the first gear formed on said cam member, for inducing the cam member to rotate.

13. A disc drive apparatus including a base plate having first and second opposite sides, and using a disc-shaped recording medium, said apparatus comprising:

- disc loading means and disc mounting means mounted on the first side of said base plate, said disc mounting means having a disc mounting surface and said disc loading means automatically loading the recording medium in a predetermined loading position on the disc mounting surface of said disc mounting means in response to an insertion of said recording medium and automatically unloading the recording medium from said predetermined loading position to an unloading position;
- disc driving means provided on the second side of said base plate for driving the recording medium mounted on said disc mounting surface;
- a driving mechanism for driving said disc loading means, said driving mechanism including a cam member and a gear train which drive said disc loading means, said cam member and said gear train being mounted on the second side of said base plate, said cam member and said gear train being adjacently and rotatably supported on the second side of said base plate in such a manner that rotating planes of said cam member and said gear train are parallel to the second side of said base plate; and
- manually operating means provided on the second side of said base plate for releasing a transmission state between said disc loading means and said driving mechanism, and triggering said disc loading means to eject said recording medium in said predetermined loading position out of said disc drive apparatus, whereby said disc driving means shares vertical space with said driving mechanism thereby minimizing a thickness of said disc drive apparatus.

14. A disc drive apparatus as claimed in claim 13, wherein said disc loading means comprises an ejecting mechanism for ejecting said recording medium from said predetermined loading position, to out of said disc drive apparatus.

15. A disc drive apparatus as claimed in claim 14, wherein said manually operating means manually actuates to trigger said disc loading means to eject said recording medium.

16. A disc drive apparatus as claimed in claim 14, wherein said cam member is rotated for loading and unloading of said recording medium.

17. A disc drive apparatus as claimed in claim 16, wherein said disc loading means comprises a loading lever, biased by a spring, for biasing said recording medium in an eject direction, and wherein said manually operating means releases the transmission state between said disc loading means and said drive means, and ejects said recording medium by means of a biasing force generated by said spring.

18. A disc drive apparatus as claimed in claim 13, wherein said disc loading means comprises a clamping member for clamping said recording medium inserted into the apparatus, onto a spindle for rotating said recording medium.

19. A recording and/or reproducing apparatus including a base plate having first and second opposite sides, said apparatus comprising:

- loading means and disc mounting means mounted on the first side of said base plate, said disc mounting means having a disc mounting surface and said loading means automatically loading a recording medium inserted into said apparatus in a loaded position on said disc mounting surface responsive to insertion of said recording medium and automatically unloading said recording medium from said loaded position to an unloaded position;
- disc driving means provided on the second side of said base plate for driving the recording medium mounted on said disc mounting surface;
- a motor for driving a cam member which drives said loading means, said motor and said cam member being mounted on the second side of said base plate, said cam member being adjacently and rotatably supported on the second side of said base plate in such a manner that a rotation plane of said cam member is parallel to the second side of said base plate;
- transmission means having a gear train, for transmitting a driving force of said motor to said loading means to drive said loading means, said transmission means being adjacently and movably provided on the second side of said base plate in such a manner that a rotating plane of said gear train is parallel to the second side of said base plate; and
- operating means provided on the second side of said base plate, for manually releasing a transmission condition of said transmission means between said loading means and said motor by releasing a transmission between said cam member and said gear train, and manually causing said loading means to eject said recording medium out of said loaded position, said operating means being provided adjacently to the second side of said base plate, whereby said disc driving, means shares vertical space with said transmission means and said motor thereby minimizing a thickness of said apparatus.

20. A recording and/or reproducing apparatus as claimed in claim 19, wherein said recording medium is a disc, and wherein said loading means comprises a clamping member for clamping said disc onto a spindle for rotating the disc.

21. A recording and/or reproducing apparatus as claimed in claim 19, wherein said gear train comprises a plurality of gears which transmit a rotation of said motor to said loading means, at a predetermined reduction ratio.

22. A recording and/or reproducing apparatus as claimed in claim 21, wherein said operating means releases rotational transmission through said gear train to disconnect said motor from said loading means.

23. A recording and/or reproducing apparatus as claimed in claim 22, wherein said loading means is biased by a spring in an eject direction to eject said recording medium out of the apparatus, and wherein said recording medium is ejected by a biasing force generated by said spring when said transmission condition of said transmission means is released by said operating means.

24. A recording and/or reproducing apparatus as claimed in claim 19, wherein said operating means is operable through an opening, the opening being formed in a front panel of the apparatus, and is located behind said front panel within the apparatus.

25. A disc drive comprising:

- drive means for driving a disc type body on which data is recordable;
- clamp means for clamping the disc type body in a predetermined relationship with said drive means;
- a cam device for moving the clamp means into a clamping position and maintaining it in the clamping position;
- cam drive means, connected to said cam device, for selectively driving said cam device;

manually operatable means for releasing the connection between said cam device and the cam drive means; and biasing means for biasing said disc type body in the clamping position in an eject direction;

wherein said clamp means comprises a clamp lever which is movably mounted on a base, a support member which is operatively connected with said clamp lever in a manner wherein it is movable vertically with respect to said base, and a center cone which is rotatably supported on said support member;

wherein said cam device comprises a cam member which is rotatably supported on said base, a cam surface formed on said cam member, said cam surface being engaged with a cam follower formed on said clamp lever, and a first gear formed on said cam member;

wherein said cam drive means comprises a motor which is supported on said base, a worm gear rotatably driven by said motor, a second gear rotatably supported on a shaft on said base and axially movable along said shaft, said second gear having first and second sets of gear teeth, said worm gear being arranged to mesh with said first set of gear teeth, an idler gear being arranged to mesh with said second set of gear teeth and the first gear formed on said cam member, and a spring which biases said second gear toward a position wherein said first and second sets of gear teeth are maintained in meshing engagement with said worm gear and said idler gear respectively; and wherein said manually operatable connection releasing means comprises a release lever which is movable with respect to said base, a slanted surface formed on said release lever which is engageable with said second gear for displacing said second gear against the bias of said spring to a position whereby the drive connection between said first and second sets of gear teeth and said worm gear and said idler gear, is disengaged.

26. A disc drive as claimed in claim 25, wherein said release lever has an end portion which is engageable with the first gear formed on said cam member for inducing the cam member to rotate.

* * * * *